United States Patent
Kulkarni et al.

(10) Patent No.: US 8,166,348 B1
(45) Date of Patent: Apr. 24, 2012

(54) METHOD OF DEBUGGING A SOFTWARE SYSTEM

(75) Inventors: Gururaj Govind Kulkarni, Bangalore (IN); Shelesh Chopra, Bangalore (IN); Shivashankar Vasanad, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/748,493

(22) Filed: Mar. 29, 2010

(51) Int. Cl.
 *G06F 11/00* (2006.01)
(52) U.S. Cl. ............... 714/38.1; 714/57; 717/124
(58) Field of Classification Search .............. None
 See application file for complete search history.

(56) References Cited

U.S. PATENT DOCUMENTS

| | | | | |
|---|---|---|---|---|
| 6,539,499 | B1 * | 3/2003 | Stedman et al. | 714/40 |
| 6,662,318 | B1 * | 12/2003 | Baysah et al. | 714/48 |
| 7,661,031 | B2 * | 2/2010 | Birsan et al. | 714/38.1 |
| 2005/0172272 | A1 * | 8/2005 | Bates et al. | 717/129 |
| 2008/0155512 | A1 * | 6/2008 | Bates et al. | 717/131 |
| 2008/0163223 | A1 * | 7/2008 | Birsan et al. | 718/102 |

* cited by examiner

*Primary Examiner* — Christopher McCarthy
(74) *Attorney, Agent, or Firm* — Krishnendu Gupta; Robert Kevin Perkins; Joseph D'Angelo

(57) ABSTRACT

A method, system, and a computer program product for debugging a software system. An aspect of the present invention provides a user with the combination of an error determined in the software system and a set of recommendations for fixing the error, thereby enabling the user to debug the software system more efficiently. In one embodiment, the error is determined by inspecting the execution states of the software system at different time instances prior to receiving a debug indication from the user. The set of recommendations for fixing the error is identified by searching a knowledge base that stores the recommendations (e.g., possible solutions, suggestions, and workarounds) for each of the errors.

11 Claims, 8 Drawing Sheets

315

401 → 4690 02/17/10 15:35:48 nsrmmgd Jukebox:rd=racdd062.nwperf.com:QUANTUM@2.0.0 access:scsidev@2.0.0 MOVE MEDIUM key:5 status:CHECK CONDITION UNKNOWN, ASC 0x53 ASCQ 0x03 failed:
402 → 42506 02/18/10 10:57:06 nsrd media info: Jukebox rd=racdd062.nwperf.com:QUANTUM@2.0.0 is now disabled.
403 → 38758 02/17/10 16:08:34 nsrd media warning: rd=racds012.nwperf.com:/dev/rmt/37cbn reading: I/O error
404 → 38758 02/17/10 16:08:34 nsrd media warning: rd=racds012.nwperf.com:/dev/rmt/37cbn reading: Tape label read for volume ?, is not recognised by NetWorker: I/O error
405 → 42506 02/17/10 16:32:27 nsrd media warning: Jukebox `rd=racdd062.nwperf.com:QUANTUM@2.0.0' Moving the jukebox rd=racdd062.nwperf.com:QUANTUM@2.0.0' to an offline state due to external jukebox event(s).
406 → 42509 02/18/10 00:00:01 nsrd registration warning event: NetWorker evaluation mode will expire in 13 days and the server will be disabled after that time.
407 → 42502 02/18/10 04:03:18 nsrd media critical event: Waiting for 2 writable volume(s) to backup pool 'NWVMclientsPool1' tape(s) or disk(s) on racds012.nwperf.com
408 → 42502 02/18/10 04:03:37 nsrd media critical event: Waiting for 1 writable volume(s) to backup pool 'NWVMclientsPool1' tape(s) or disk(s) on racds012.nwperf.com

*FIG. 4A*

| STATE ID | CATEGORY | DATE AND TIME | COUNT | SOURCE | COMPONENT | THIRD PARTY CODE | STATE MESSAGE | LOG |
|---|---|---|---|---|---|---|---|---|
| 4690 | Error | 2/17/2010 15:35 | 3 | nsrmmgd | Jukebox | ASC 0x53, ASCQ 0x03 | Check Condition Unknown | A.log |
| 42502 | Critical | 2/18/2010 3:58 | 10 | nsrd | Media | NA | Waiting for writable volume(s) | A.log |
| 42506 | Info | 2/18/2010 10:57 | 2 | nsrd | Jukebox | NA | Jukebox <name of jukebox> disabled | A.log |
| 38758 | Warning | 2/17/2010 15:33 | 3 | nsrd | Media | NA | Tape label read for volume ? in pool ?; is not recognised by NetWorker: I/O error | A.log |
| 42509 | Warning | 02/18/10 00:01 | 1 | nsrd | License manager | NA | NetWorker evaluation mode will expire in 13 days and the server will be disabled after that time. | A.log |

| SEID | ERROR MESSAGE | RESOLUTION | WORKAROUND | KNOWN ISSUES |
|---|---|---|---|---|
| 92096 | Unable to get local copy of the file web references\mappointservice\reference.cs | Update the web references for the projects that are in clienttocentermap, datauploadclient, Dragpushpinonmap. | Downloading and updating of mappoint webservice.sdk can be done in autolog mode | NIL |
| 17434 | Error loading the browser components | change the IE3_Installed() function so that it searches the registry for the correct text value in the CLSID key | Verification of browser installation can be done by code in the Load event of the WebBrowseWeb form by checking the IE30Present property of the clsIE30Status class | NIL |
| 42509 | NetWorker evaluation mode will expire in 13 days and the server will be disabled after that time | Register the NetWorker license | License validity can be extended by adding "grace" in Auth code | NIL |
| 83722 | An unhandled exception of type 'System.NullReferenceException' occurred in Client.exe | In Solution Explorer, right-click the solution, and then click Properties. The Solution 'TCPIPListener' Property Pages dialog box appears. In the Action field of the Listener project, click Start without debugging and click OK. | TCPIP Listener can be set to operate in a new mode by opening the TCPIPListener solution. This solution is located in the Installation Path\Vb7\VB Samples\WinForms-Threads-TCPListener\TCPIPListener folder. | NIL |
| 13540 | The Browser service has failed to retrieve the backup list too many times on transport \Device\Protocol_NetworkAdaptor. The backup browser is stopping. | Unbind all but one of the TCP/IP subnet transport bindings from the workstation service and remove all but one of the network cards or remote access connections. | The unbinding can be done by maintaining all its server information on a per-transport basis. | NIL |

380

METHOD OF DEBUGGING A SOFTWARE SYSTEM

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to software maintenance, and more specifically to methods, systems, and a computer program product for debugging of software systems.

BACKGROUND

A software system refers to a collection of software components such as user applications, application modules, virtual machines, operating systems, etc. that operate together to perform various tasks requested by a user. During the execution (or use) of the software system, deviations (in terms of functionality, results, performance throughput, etc.) from a desired/expected behavior of the software system may be observed. Debugging refers to the process of identifying and fixing the errors (that cause the deviations) in the software system. Several challenges are presented in debugging of software systems, often due to the large number/types of components present in the software system.

SUMMARY

An aspect of the present invention provides a user with the combination of an error determined in the software system and a set of recommendations identified for fixing the error. In one embodiment, the software system is designed to store its execution states at different time instances. Accordingly, on receiving an indication to debug the software system, the execution states at time instances prior to receiving the debug indication are inspected to determine the error. The set of recommendations for fixing the determined error is then identified and provided (along with the error) to the user.

BRIEF DESCRIPTION OF DRAWINGS

The above and further advantages of the present invention may be better under stood by referring to the following description taken into conjunction with the accompanying drawings in which:

FIG. 4A shows portions of a sample log file analyzed by debug tool 150 of FIG. 1 for determining the errors in a software system;

FIG. 4B shows portions of a database storing execution characteristics generated by parsing block 330 of FIG. 3;

FIG. 4C shows portions of a knowledge base used for identifying recommendations for fixing errors by search block 370 of FIG. 3;

DETAILED DESCRIPTION

Current approaches to debugging a software system necessitate a user/developer to manually inspect the execution states stored by a software system for determining the errors in the software system. Such a manual inspection is generally inefficient (consuming a larger amount of time/resources) due to the voluminous size of the set of execution states stored for a software system, and in some scenarios, due to the different formats in which the execution states are stored.

Furthermore, the user after determining the error is required to identify the possible fixes for the error by searching in electronic media such as websites, online databases, discussion forums, etc as well as in non-electronic media such as books, product guides, release notes, etc. Accordingly, the debugging of a software system often a tedious task.

The techniques described herein provide a user with the combination of the error determined in the software system and a set of recommendations identified for fixing the errors. In one embodiment, the software system is designed to store its execution states at different time instances. On receiving an indication to debug the software system, the steps of determining the error by inspecting the execution states stored by the software system corresponding to time instances prior to receiving the debug indication, identifying the set of recommendations for fixing the determined error, and providing the determined error and identified recommendations to the user are performed. Accordingly, the debugging of the software system is simplified and made more efficient.

In a preferred embodiment, described below, the error is determined by first parsing each of the execution states stored in a first format by the software system to identify corresponding values for a set of fields. A set of execution characteristics at different time instances are then generated (either created or computed based on the values of the set of fields) and stored in a database in a second format, which is more appropriate in comparison to the first format, for searching large amounts of data. Specific queries directed to determining desired errors are formed according to a set of rules and performed on the set of execution characteristics stored in the database to determine the errors in the software system.

The recommendations for the determined errors are identified by searching a knowledge base, which maintains the recommendations for different errors. The knowledge base may include a error message repository, a set of product release notes, a support knowledge base and a defect tracking system. The identified recommendations may include possible solutions, suggestions, and workarounds for fixing the determined errors.

Reference is now made in detail to exemplary embodiments of the invention, examples of which are illustrated in the accompanying Figures.

Figure 1:
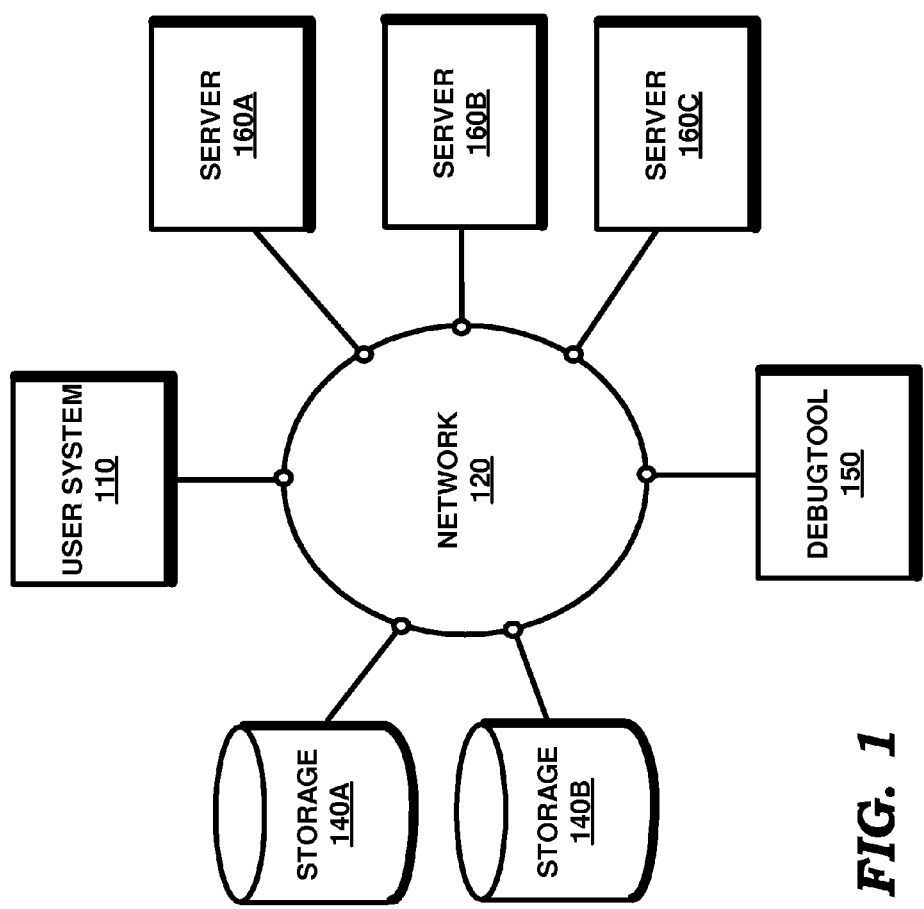
FIG. 1 shows an example environment in which several aspects of the present invention are implemented in one embodiment.

FIG. 1 shows an example environment in which several aspects of the present invention are implemented in one embodiment. The example environment is shown containing user system 110, storages 140A-140B, debug tool 150 and servers 160A-160C connected by network 120. However, the example environment may contain more number/type of user systems, servers, and storages, depending on the purpose for which the environment is designed.

User system 110 represents a system such as personal computer, workstation, mobile station, etc., used by end users to generate user requests (using appropriate user interfaces) to enterprise applications executing in server systems 160A-160C. In general, user system 110 requests an enterprise application for performing desired tasks and receives corresponding responses containing the results of performance of the requested tasks.

Network 120 provides connectivity between the various systems of FIG. 1 and may be implemented using protocols such as Transmission Control Protocol (TCP) and/or Internet Protocol (IP), well known in the relevant arts. Network 120 may also be implemented to provide support for various storage architectures such as storage area network (SAN), Network-attached Storage (NAS), Direct-attached Storage (DAS), etc.

Each of storage 140A-1140B represents an external non-volatile storage system facilitating storage and retrieval of a collection of data by other systems connected to network 120. A storage may be implemented as a relational database system and therefore provide storage and retrieval of data using structured queries according to a Structured Query Language (SQL). Alternatively, the storage may be implemented as a file system providing storage and retrieval of data in the form of one or more files organized as one or more directories, as is well known in the relevant arts.

Each of servers 160A-160C represents a web/application server, which executes enterprise applications capable of performing tasks requested by users using user system 110. The enterprise applications may perform the tasks on data maintained internally or on external data (for example, maintained in storages 140A-140B) and then send the result of performance of the tasks to user system 110. It should be noted that different modules of the same enterprise application may be deployed and executed on different systems to facilitate the performance of tasks.

Furthermore, each of servers 160A-160C may also contain other software programs (not shown) such as operating system (for example, UNIX), device drivers (each usually corresponding to a hardware component), virtual machine software (such as JVM available from Sun Microsystems), etc., that provides a (common) run time environment facilitating the execution of the enterprise applications/modules. The execution of enterprise applications may also require the services provided by data drivers, database management software (such as an RDBMS) executing in storages 140A-140B.

Thus, the software programs, device/data drivers, etc., and the enterprise applications (or the modules thereof) may be viewed as software components of a software system, with the software components operating together in processing the user requests.

It may be appreciated that during the performance of tasks by the software system, deviations (in terms of functionality, results, performance throughput, etc.) from a desired/expected behavior of the software system may be observed. Such deviations may be due to the presence of errors in the software system. These errors may include, without limitation, logical errors (causing deviations due to wrong logic), functional errors (causing deviations due to the software not performing/functioning as expected), runtime errors (causing deviations due to problems with the environment in which the software is executed), etc.

Accordingly, it may be desirable to debug the software system to identify and fix the errors causing the deviations. The fixing of the errors may result in the software system operating according to the desired/expected behavior.

Several approaches can be used for debugging a software system. In one approach, the different software components forming a software system are designed to store the execution states of the software system at different time instances. An execution state captures the state of the software system in terms of several of the values of several variables of interest, the functions/components invoked, the values of the parameters of the function invocations, the details of exceptions/deviations observed, a pre-defined state identifier (typically a number) and state category (such as "warning", "error", "critical", etc.) etc. at the corresponding time instance. In addition, some of the software systems may be designed to store less or more details of the state of the system based on a debug level during the different time instances, as is well known in debugging type of environments.

Accordingly, when deviations are observed in the software system, a user/developer may manually inspect the execution states (at desired time instances) to determine the errors causing the deviations. The user/developer may then identify possible fixes for the determined errors by searching in electronic/non-electronic media. The user/developer may use appropriate search tools for performing the steps of determining errors and identifying possible fixes.

There are several challenges to the above noted manual/semi-manual approach. One challenge is the voluminous size of the set of execution states stored for a software system. Since the software system is constantly processing user requests, a large number of executions states may be generated and stored over a short duration. Reducing the number of execution states stored (for example, by not storing the states of specific categories) may make determination of the error by a user/developer more difficult.

Another challenge is that the format in which the execution states are stored may not be suitable for (quick) determination of the errors. For example, in a common scenario, the execution states are stored as simple strings in a text file (referred to as a "log file") to avoid unnecessary processing overhead to the software system. The user/developer needs to search for the presence of specific strings (that the user/developer has prior knowledge of) in the log file for determining the errors.

An additional challenge is presented by the larger number/type of software components present in a software system. For example, the different components may store their corresponding execution states separately in different locations/log files and/or the different types of components may store the execution states in different formats. The user/developer may then be required to inspect multiple locations/log files, have prior knowledge of the different formats, use different tools for inspecting different log files/formats, etc. to determine the errors using the execution states.

One challenge with the identification of the possible fixes for an error is caused due to the lack of co-relation between the determined error and the references to the same error in the electronic/non-electronic media. Though the fixes to some of the errors may be identified based on the pre-defined state identifiers and categories, there are several environments where such a simple co-relation does not exist and the user/developer needs to perform multiple steps for identifying the possible fixes.

For example, an application in the software system may have multiple releases, with each release having a corresponding release notes identifying the specific errors that may occur in the release. After determining the error, the user/developer may be required to search each of the release notes (from the latest to the oldest) for the occurrence of the state identifier to identify the possible fixes.

Debug tool 150, provided according to several aspects of the present invention, facilitates (and simplifies) the debugging of a software system, while overcoming some of the challenges noted above.

Figure 2:
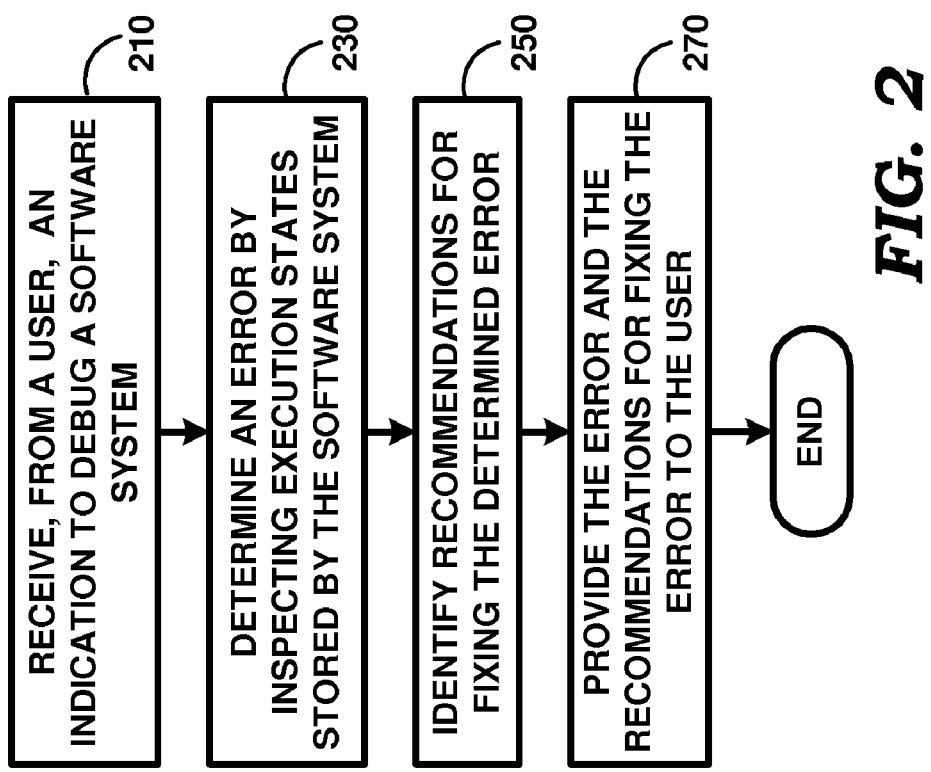
FIG. 2 shows an overview of an embodiment of debugging a software system by debug tool 150 of FIG. 1.

FIG. 2 shows an overview of an embodiment of debugging a software system by debug tool 150 of FIG. 1. However, in alternative embodiments, some of the steps may be performed in a different sequence than that depicted below, as suited to the specific environment, as will be apparent to one skilled in the relevant arts.

In step 210, debug tool 150 receives, from a user, an indication to debug a software system. The indication may be received from the user using any of the systems of FIG. 1 (e.g., user system 110) for debugging a software system containing software components executing in storages 140A-140B or servers 160A-160C. As noted above, the software system is designed to store its execution states at different time instances.

In step 230, debug tool 150 determines the occurrence of an error by inspecting the execution states stored by the software system corresponding to time instances prior to the time instance at which the debug indication was received. The determination may be performed in any convenient manner based on the format in which the execution states are stored.

In a preferred embodiment, debug tool 150 analyzes the execution state information stored in a set of formats (for example, text format), converts the analyzed information to a common/tabular format appropriate for storage in databases, and stores the converted execution state information in the common format in a database. Debug tool 150 then determines the occurrence of the error by querying the database. As is well known, the querying of a database of voluminous size is generally more efficient in terms of time/resources consumed than searching for a string in one or more text/log files of voluminous size. Accordingly, the determination of the occurrence of errors is simplified.

In step 250, debug tool 150 identifies recommendations for fixing the determined error by searching a knowledge base (specifying recommendations corresponding to different errors) to find the recommendations for the determined error.

The knowledge base, provided according to an aspect of the present invention, may include in electronic form an error message repository, a set of product release notes, a support knowledge base, and a defect tracking system. Accordingly the identified recommendations may include possible solutions, suggestions, and workarounds for fixing the determined error.

The recommendations maintained in the knowledge base are co-related to the errors by associating the recommendations to error identifiers. Each error identifier is chosen to be unique for the software system in its entirety, i.e., across all the different number/type of software components as well as the various releases for each software component. As such, the identified recommendations are those that are found in the knowledge base to be associated with the error identifier of the determined error. The use of such a "system error identifier" may ensure that only the most relevant recommendations for the determined error are identified.

In step 270, debug tool 150 provides the details of the error (determined in step 230) and the recommendations for fixing the error (identified in step 250) to the user. The information on the error and the corresponding recommendations may be provided as a response to the indication received in step 210. The response may be sent to the requesting system (e.g. user system 110), where the error and recommendations may then be displayed as part of a user interface.

Thus, a user is facilitated to debug a software system containing multiple software components. By providing the combination of the error determined and the recommendations for fixing the error, the debugging of the software system is simplified.

Figure 3:
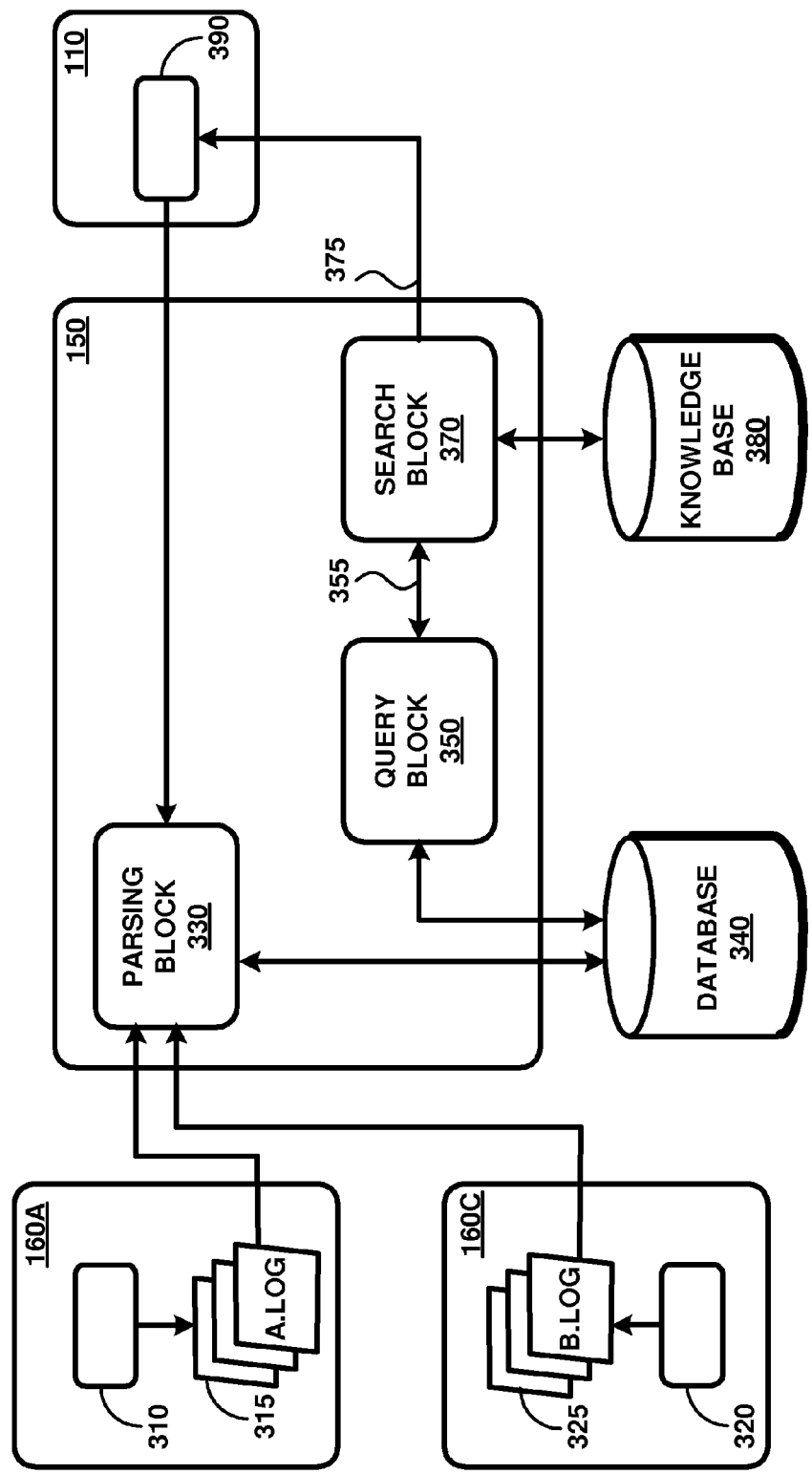
FIG. 3 shows components of an example implementation for debugging a software system, such as debugging tool 150 of FIG. 1.

FIG. 3 shows components of an example implementation for debugging a software system, such as debugging tool 150 of FIG. 1. The description is continued assuming that the software system sought to be debugged is a NetWorker software system (hereafter referred to as "backup system") available from EMC Corporation of Hopkinton which performs backup and recovery of data.

Broadly, backup system contains one or more client modules executing in systems that store the data sought to be backed up, a media server module that is connected to (and manages) various storages (to which the backups are performed), and a policy engine module that drives the whole backup workflow. The backup system may also contain other modules such as a license manager module that checks the validity of client/server licenses, etc.

The description is continued assuming that a client module is executing in server 160A, the media server module is executing in server 160C and is connected to storages 140A-140B, while the policy engine module is executing in server 160B (and drives the backup of the data from system 160A to storages 140A-140B). Furthermore, network 120 is implemented to provide support for storage architectures such as SAN/NAS/DAS to facilitate the various modules of the backup system to interact with each other.

Thus, software component 310 shown executing in server 160A represents the client module and component 320 shown executing in server 160C represents the media server module. Other components of the backup system (not shown here for conciseness) may also be present and may be executing in servers 160A-160C or storages 140A-140B.

During the execution (use) of the backup system, component 310 stores its execution states at different time instances in log files 315, while component 320 stores its execution states in log files 325. Each of log files 315 and 325 represents a collection of files storing the execution states in a text format, and is shown respectively containing the log files named "A.log" and "B.log".

FIG. 4A shows portions of a sample log file analyzed by debug tool 150 of FIG. 1 for determining the errors in a software system. The sample log file "A.log" contains the execution states of component 310 at different time instances in a text format. In particular, each execution state is stored as a corresponding line in the log file, with the different details of the execution state stored as corresponding fields (separated by one or more spaces) in the line.

Thus, line 401 specifies the execution state of component 310 at the time instance 02/17/10 15:35:48 (as indicated by the second and third fields). The execution state specifies a state identifier as 4690 (first field), the source/procedure that stored the execution state as "nsrmmgd", the component that stored the execution state as "JukeBox", third party error codes such as "ASC 0x53", a state message as "Check Condition Unknown" and other information. Similarly, each of lines 402-408 specifies the execution state of component 310 at different time instances. It is noted that some of the execution states (lines 402, 406, 407) also specify a state category such as "info", "warning", and "critical".

Referring again to FIG. 3, debug tool 150, provided according to several aspects of the present invention, facilitates debugging of the backup system based on the log files stored by the backup system. Debug tool 150 is shown containing parsing block 330, query block 350 and search block 370.

Parsing block 330 is designed to analyze the information in log files (such as 315 and 325) to identify the execution states for different time instances and the set of fields for each execution state. For example, for the text format, parsing block 330 may identify execution states as being specified in separate lines and the fields as being specified separated by one or more spaces in the same line.

Parsing block 330 may perform the parsing of the log files in response to receiving an indication to debug the backup system from a user/developer using user interface (UI) 390. In addition to the debug indication, parsing block 330 may also receive a set of criteria for debugging the software system from the user/developer using UI 390. The criteria may indicate the specific software components to be debugged, the specific execution state category to be inspected, a time interval in which execution states are to be inspected, a text to be searched in the state messages in the execution states, etc. Parsing block 330 may accordingly be designed to analyze the information in the log files based on the criteria received from the user.

On receiving the debug indication, parsing block 330 retrieves the log files stored by the backup system including log files 315 and 325 from the corresponding systems. Alternatively, the user/developer may upload the specific log files to be inspected to debug tool 150 prior to sending the debug indication.

Broadly, parsing block 330 analyzes the execution state information (e.g. log files) stored in a set of formats (such as text format), converts the analyzed information to a common/tabular format appropriate for storage in databases, and stores the converted execution state information in the common format in a database.

In one embodiment, when the execution state information is stored in one or more log file in a single format (such as text format), parsing block 330 contains a single parser designed to convert the information from text format to tabular format. However, such a technique may not be applicable in software systems containing different types of software components.

An aspect of the present invention enforces each of the software components to use a common framework for storing execution state, with the common framework being designed to store the execution states in one or more log files according to a first format (e.g., text format). The format may include a field identifying the specific software component that stores a corresponding execution state. Parsing block 330 accordingly may contain only a common parser to parse all the log files and to convert the execution state information to the tabular format.

Another aspect of the present invention enables the different types of software components to store the execution state information in multiple formats (e.g., text format, binary format, comma-separated/tab-separated values). Parsing block 330 accordingly may contain a set of parsers, with each parser designed to parse one of the multiple formats and to covert the parsed information to the common/tabular format.

Thus, parsing block 330 converts the execution state information from formats not appropriate for searching to a common/tabular format more appropriate for searching to facilitate determination of the errors in the software system.

In a preferred embodiment, parsing block 330 first generates a set of execution characteristics corresponding to each of the time instances based on set of fields in the execution states (determined by analyzing the log files). An execution characteristic represents a feature/trait of the execution state based on which different execution states can be differentiated. In other words, execution states having the same value for an execution characteristic may be viewed as being same/similar, while execution states having different values may be viewed as being dissimilar to each other.

Parsing block 330 may create some of the execution characteristics based on the values for the set of fields identified in the execution states. For example, parsing block 330 may create execution characteristics for the state identifier, the state category, the time instance at which the corresponding execution state was stored, etc. Parsing block 330 may also compute some of the execution characteristics based on the field values. For example, parsing block 330 may compute a count of the number of occurrences of the same state identifier in the execution states. Other computed characteristics may be determined as a concatenation of multiple fields, as the number of times a specific category is repeated, as the top five most frequent errors, as a component/time wise breakdown, etc.

Parsing block 330 then stores the execution characteristics generated (both created and computed) based on the execution state information in database 340. Database 340 represents a relational database system providing storage and retrieval of data using structured queries according to a Structured Query Language (SQL).

FIG. 4B shows portions of a database (340) storing execution characteristics generated by parsing block 330 of FIG. 3. Each column represents an execution characteristic generated (either created or computed) based on the fields in the execution states.

Thus, columns "State ID", "Category", "Date and Time" "Source", "Component" "Third Party Code", "State message", and "Log" respectively represent the execution characteristics created for the state identifier, the state category, the time instance at which the corresponding execution state was stored, the source/procedure that stored the execution state, the identifier of the software component that stored in the execution state, third party error codes, the state message, and the file identifier the log file in which the execution state was stored. The column "Count" is a computed execution characteristic representing the count of the number of occurrences of the same state identifier in the execution states.

Each row represents the set of execution characteristics corresponding to a time instance (as indicated by the "Date and Time" column). The set of execution characteristics may be generated based on the execution states stored in the log file. For example, the row with the state identifier "4690" may be generated based on the fields in the execution state of line 401 in FIG. 4A. However, the value "3" of the computed characteristics such as "Count" in the same row may be determined only after multiple executions states have been analyzed.

Referring again to FIG. 3, query block 350 is designed to query the execution characteristics stored in database 340 for determining the occurrence of errors in the software/backup system. Query block 350 may query (and also retrieve) the execution characteristics by executing one or more structured queries (according to SQL) on database 340.

The specific queries to be executed by query block 350 for determining errors in the software system may be pre-defined. Alternatively, query block 350 may be designed to maintain a set of rules (provided in the form of user inputs, configuration files, etc.) and to form the queries for determining the occurrence of errors based on the rules. Each rule specifies conditions to be satisfied by the execution characteristics for determining the occurrence of a corresponding error.

For example, a rule may specify that a set of execution characteristics having the state identifier as "42509", the state category as "Warning", the component identifier as "License Manager" and a state message containing "expire" determines the occurrence of the error identified by the system error identifier (SEID) "42509". Query block 350 may accordingly form an SQL query such as:

SELECT *
FROM exestates
WHERE stateid='42509'
AND category='Warning'
AND component='Licence Manager'
AND statemessage LIKE '% expire %' where "SELECT", "WHERE", "AND", "LIKE" and "%" are keywords/operators in SQL, and "exestates" is the name of the table in database 340 storing the execution characteristics of FIG. 4B.

Query block 350 executes the queries formed from the rules and then determines that the error has occurred if there exists at least one set of execution characteristics which satisfies the conditions specified in the corresponding rule (in other words, if the performance of the query contains at least one result). For the above example, query block 350 determines that the error with SEID 42509 has occurred since the performance of the query will contain one result, the row with state identifier "42509" in the data of FIG. 4B.

Similarly, query block 350 forms and executes multiple queries to determine the occurrence of other errors in the software/backup system. Query block 350 then forwards (path 355) the details such as the SEID, state ids, state messages, etc. of the determined errors to search block 370.

Search block 370 is designed to receive the details of the errors determined in the software system from query block 350 and to identify recommendations for fixing each of the determined errors by searching in knowledge base 380. Search block 370 may performs the search of knowledge base 380 in any convenient manner based on format in which knowledge base 380 is maintained.

Knowledge base 380, provided according to an aspect of the present invention, represents a non-volatile storage (similar to storages 140A-140B) maintaining the recommendations for fixing errors determined in the software system. Though shown as a single system for convenience, knowledge base 380 typically contains multiple systems such as an error message repository, a set of product release notes, a support knowledge base, and a defect tracking system. The identified recommendations may include possible solutions, suggestions, and workarounds for fixing the determined error.

FIG. 4C shows portions of a knowledge base (380) used for identifying recommendations for fixing errors by search block 370 of FIG. 3. The knowledge base is shown as being maintained in a tabular format merely for convenience. However, in alternative embodiments, the knowledge base may be maintained using any convenient data format such as extensible markup language (XML).

Column "SEID" specifies a system error identifier uniquely identifying the determined error in the software system, while column "Error Message" specifies the error message for the error. Columns "Resolution", "Workaround" and "Known Issues" specify the various recommendations for the error identified by the SEID column.

It may be observed that the state identifiers specified in the log files (execution states) are also used as the "SEID" for the errors. Such reuse of the identifiers may be possible when the execution state identifiers stored by different components are distinct and themselves represent error conditions in the software system. However, in many environments, a separate SEID different from the state identifies may be used for identifying the errors in the software system.

Referring again to FIG. 3, search block 370 identifies the recommendations that are found in knowledge base 380 to be associated with the error identifier (SEID) of the determined error. Thus, on receiving the SEID 42509, search block 370 identifies the resolution "Register the NetWorker license", the workaround "License validity can be extended by adding "grace" in Auth code", and the known issue "NIL" (indicating that there are no known issues) as the recommendations corresponding to the SEID in knowledge base 380.

After identifying the recommendations for each of the determined errors (received from query block 350) based on knowledge base 380, search block 370 forwards (path 375) the identified recommendations along with the details of the errors to UI 390 to enable the combination of the error and its recommendations to be provide to the user/developer.

Figure 5:
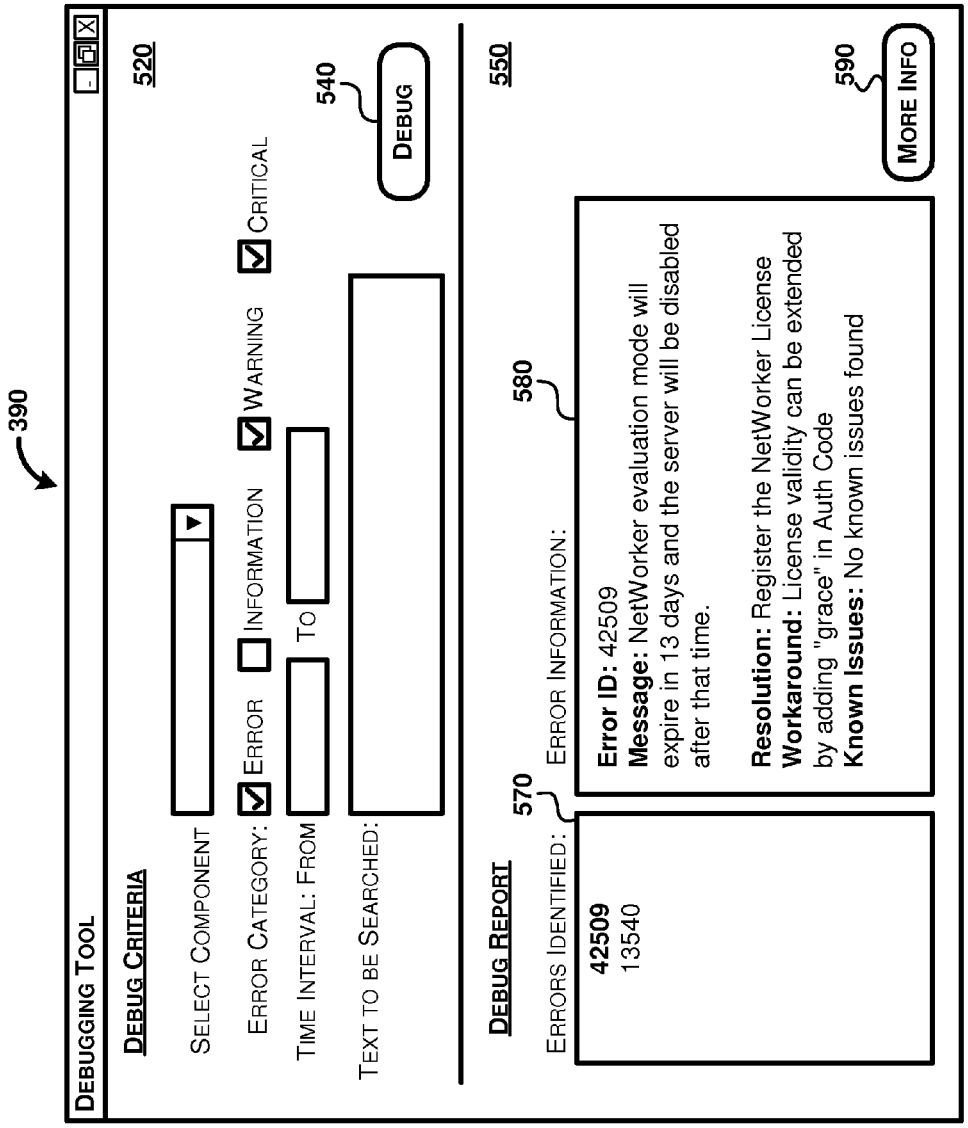
FIG. 5 shows a sample user interface displaying the combination of errors and the corresponding recommendations for fixing the errors provided by debug tool 150 of FIG. 1.

FIG. 5 shows a sample user interface (390) displaying the combination of errors and the corresponding recommendations for fixing the errors provided by debug tool 150 of FIG. 1. The user interface may be displayed on a display unit (not shown) associated with one of the systems of FIG. 1 (e.g. user system 110) in response to requests from a user from the corresponding system. In an embodiment, user interface 390 is a web based interface where the requests are generated in the form of URLs from user system 110 and the interface is sent encoded in a hypertext markup language (e.g. HTML) for display in a web browser executing in user system 110.

Display area 520 enables a user/developer to specify various criteria for debugging a software system. The user/developer may then click/select button 540 (labeled "Debug") to send an indication to debug the software system (containing various software components executing in the systems of FIG. 1, such as the backup system described above) along with the specified criteria to debug tool 150.

Display area 550 displays the combination of errors in the software system and the recommendations for fixing the errors provided by debug tool 150. In particular, list area 570 displays a list of the system error identifiers identifying the errors determined in the software system. List area 570 is shown displaying two errors with the SEID "42509" and "13540" as being determined in the software/backup system sought to be debugged.

On a user selecting an error in list area 570, the corresponding combination of the details of the selected error and the recommendations for fixing the selected error is displayed in display area 580. It may be observed that the user has selected (as indicated by bold formatting) the error with SEID "42509" in list area 570, and accordingly display area 580 is shown displaying the combination of the details of the error and the recommendations for fixing the error with SEID "42509".

It may be appreciated that the details and recommendations provided in display areas 580 corresponding to error with SEID "42509" corresponds to the information identified by debug tool 150 in knowledge base 380 shown in FIG. 4C (the row "42059"). A user/developer may also click/select button 590 (labeled "More Info") to view additional information on the error and/or the recommendations.

Figure 6:
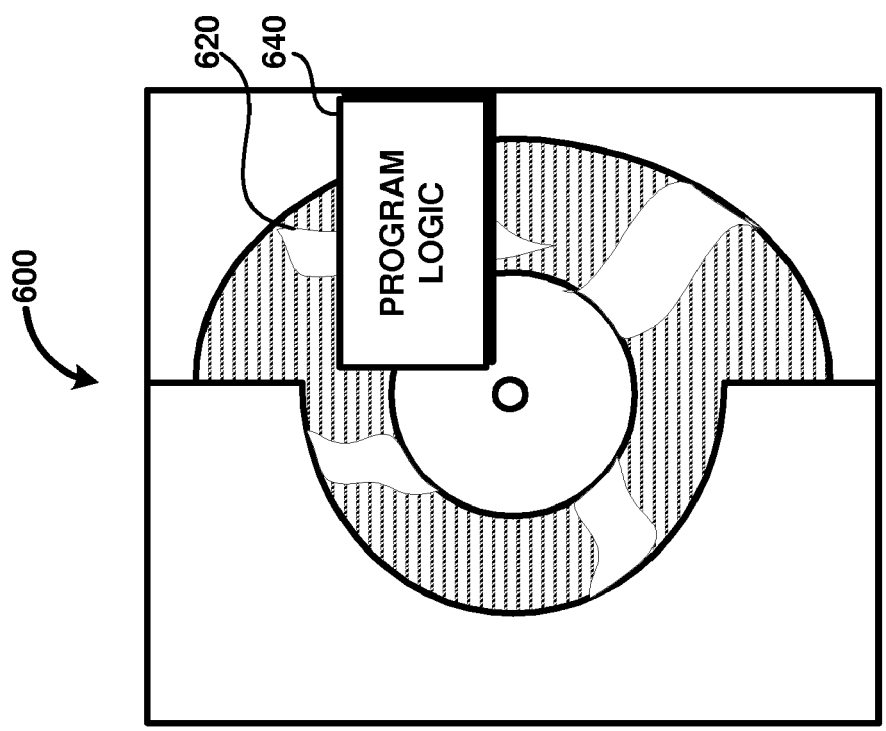
FIG. 6 shows a computer-readable medium encoded for debugging a software system embodiment of FIG. 2.

FIG. 6 shows a computer-readable medium encoded for debugging a software system embodiment of FIG. 2. Program logic 640 embodied on computer-readable medium 620 is encoded in computer-executable code configured for carrying out the prediction of the policies and other aspects of the present invention described herein and thereby forms a computer program product 600.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of a program code, which when received and loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer implemented method of debugging a software system, the software system comprising software components, the method comprising:
   enforcing each of the software components to use a common framework for storing execution states;
   storing execution states of the software system in a first format, wherein each of the execution states corresponds to one of the software components at a corresponding time instance,
   wherein the common framework is designed to store the execution states in the first format, the first format including a first field identifying the specific one of the software components storing a corresponding execution state,
   wherein the common framework stores the execution states in a plurality of log files, each log file corresponding to a software component;
   receiving, from a user, an indication to debug the software system, wherein the indication specifies a time instance;
   determining the occurrence of a first error in the software system by inspecting at least one of the stored execution states corresponding to time instances prior to the time instance, wherein the first error is determined based on the stored execution states of at least two different software components,
   wherein the determining comprises:
      generating a set of execution characteristics corresponding to each of the plurality of time instances based on the plurality of execution states;
      storing the set of execution characteristics for each of the plurality of time instances in a database; and
      querying the set of execution characteristics maintained in the database to determine the occurrence of the first error in the software system,
   wherein the generating further comprises:
      parsing each of the execution states stored in the first format to identify corresponding values for a set of fields,
      wherein the parsing comprises using a common parser to parse all of the plurality of log files to determine the set of execution characteristics of the software system; and
      creating a first subset of execution characteristics based on the values for the set of fields identified for an execution state, wherein the first subset of execution characteristics is contained in the set of execution characteristics for a corresponding time instance;
   maintaining a knowledge base specifying a plurality of sets of recommendations for a corresponding set of errors, wherein the set of errors includes the first error;
   identifying a first set of recommendations for fixing the first error,
   wherein the identifying further comprises:
      searching, after the determining the first error, the knowledge base for recommendations for the first error; and
      finding the first set of recommendations in the plurality of sets of recommendations corresponding to the first error; and
   providing, to the user, the first error and the first set of recommendations to enable the user to debug the software system,
   wherein the determining, the identifying and the providing are performed in response to the receiving the indication to debug the software system.

2. The method of claim 1, wherein the first subset of execution characteristics includes a execution state identifier, an execution state category, a time instance at which the corresponding execution state was stored, an identifier of a software component corresponding to the first field, a state message corresponding to information in the execution state and a file identifier corresponding to the identifier of the log file in which the execution state was stored.

3. The method of claim 1, wherein the generating further comprises:
   computing a second subset of execution characteristics based on the values for the set of fields identified for some of the execution states, wherein the second subset of execution characteristics is contained in the set of execution characteristics for a corresponding time instance.

4. The method of claim 3, wherein the second set of execution characteristics includes a count of the number of occurrences of an execution state identifier in the execution states.

5. The method of claim 1, wherein the indication further specifies a set of criteria for debugging the software system, wherein the parsing is performed according to the set of criteria,
   wherein the set of criteria includes a first criteria indicating the specific software components contained in the software system to be debugged, a second criteria indicating the specific execution state category to be inspected, a third criteria specifying a time interval in which execution states are to be inspected and a fourth criteria specifying a text to be searched in the state messages of the execution states.

6. The method of claim 5, wherein the storing stores the set of execution characteristics for each of the time instances in the database according to a second format, wherein the determining further comprises:
  maintaining a set of rules for determining the occurrences of errors;
  forming a first query based on a first rule contained in the set of rules, wherein the first rule specifies a first set of conditions to be satisfied by a set of execution characteristics for determining the occurrence of the first error; and
  executing the first query on the database to determine the occurrence of the first error in the software system if there exists a first set of execution characteristics corresponding to a first time instance in the database which satisfies the first set of conditions.

7. A non-transitory machine readable medium storing one or more sequences of instructions for causing a system to debug a software system, the software system comprising software components, wherein execution of the one or more sequences of instructions by one or more processors contained in the system causes the system to perform the actions of:
  storing execution states of the software system, wherein each of the execution states corresponds to one of the plurality of software components at a corresponding time instance;
  maintaining a knowledge base specifying a plurality of recommendations for fixing a set of errors;
  receiving, from a user, an indication to debug the software system, wherein the indication specifies a time instance;
  determining the occurrence of a first error in the software system by inspecting a subset of the execution states corresponding to time instances prior to the time instance, wherein the first error is determined based on the stored execution states of at least two different software components;
  identifying, in the knowledge base, a first set of recommendations for fixing the first error, wherein the first set of recommendations is contained in the plurality of recommendations; and
  providing, to the user, the first error and the first set of recommendations to enable the user to debug the software system,
  wherein the determining, the identifying and the providing are performed in response to the receiving the indication to debug the software system
  wherein the knowledge base comprises a error message repository, a set of product release notes, a support knowledge base and a defect tracking system,
  wherein the recommendations include possible solutions, suggestions, and workarounds for fixing the first error.

8. The non-transitory machine readable medium of claim 7, wherein each of the set of errors is uniquely identified in the software system by a corresponding system error identifier,
  wherein the maintaining maintains each of the plurality of recommendations associated with the system error identifier of a corresponding error, wherein the first set of recommendations is maintained associated with a first system error identifier of the first error,
  wherein the identifying identifies the first set of recommendations in the plurality of sets of recommendations based on matching the first system error identifier of the first error.

9. The non-transitory machine readable medium of claim 7, wherein the software system stores each of the execution states according to a first format, wherein the determining further comprises:
  parsing each of the execution states stored in the first format to identify corresponding values for a set of fields;
  generating a set of execution characteristics corresponding to each of the time instances based on the values for the set of fields identified for an execution state;
  storing the set of execution characteristics for each of the time instances in a database in a second format, wherein the second format is different from the first format; and
  querying the set of execution characteristics maintained in the second format in the database to determine the occurrence of the first error in the software system.

10. The non-transitory machine readable medium of claim 9, wherein the querying further comprises:
  maintaining a set of rules for determining the occurrences of the set of errors;
  forming a first query based on a first rule contained in the set of rules, wherein the first rule specifies a first set of conditions to be satisfied by a set of execution characteristics for determining the occurrence of the first error; and
  executing the first query on the database to determine the occurrence of the first error in the software system if there exists a first set of execution characteristics corresponding to a first time instance in the database which satisfies the first set of conditions.

11. A computing system comprising:
  a plurality of systems to execute software components forming a software system, wherein the software system is designed to store the execution states of the software components corresponding to different time instances,
  wherein the software system stores in the one or more files, each of the execution states according to a first format;
  a database to maintain data in a second format, wherein the second format is different from the first format;
  a user system to enable a user to send an indication to debug the software system; and
  at least one processor executing instructions retrieved from a memory to operate as a debug tool, the debug tool to receive the indication at a time instance and in response operable to:
    determine the occurrence of a first error in the software system by inspecting a subset of the execution states corresponding to a plurality of time instances prior to the time instance, wherein the debug tool determines the first error based on the stored execution states of at least two different software components;
    identify a first set of recommendations for fixing the first error; and
    provide, to the user, the first error and the first set of recommendations to enable the user to debug the software system,
    wherein the debug tool to determine the first error is operable to:
      parse each of the execution states stored in the first format to identify corresponding values for a set of fields;
      generate a set of execution characteristics corresponding to each of the time instances based on the values for the set of fields identified for an execution state;
      store the set of execution characteristics for each of the time instances in the database in the second format; and
      query the set of execution characteristics maintained in the second format in the database to determine the occurrence of the first error in the software system; and a knowledge base maintaining a plurality of recommendations for fixing a set of errors including the first error, wherein each of the set of errors is uniquely identified in the software system by a corresponding system error identifier, wherein the knowledge base maintains each of the plurality of recommendations associated with the system error identifier of a corresponding error, wherein the first set of recommendations is maintained associated with a first system error identifier of the first error, wherein the debug tool identifies the first set of recommendations in the plurality of sets of recommendations based on matching the first system error identifier of the first error, wherein the knowledge base is stored in a non-volatile storage separate from one or more files in which the execution states are stored.

\* \* \* \* \*